United States Patent [19]
Schippers

[11] Patent Number: 4,826,573
[45] Date of Patent: May 2, 1989

[54] METHOD FOR PROCESSING SUBSTANTIALLY SOLID ORGANIC MATERIAL

[75] Inventor: Wilhelmus J. H. Schippers, Hoogstraten, Belgium

[73] Assignee: Iris M. P. Van Der Heyden, Hoogstraten (Meerle), Belgium

[21] Appl. No.: 135,340

[22] Filed: Dec. 21, 1987

[30] Foreign Application Priority Data

Dec. 24, 1986 [BE] Belgium ............... 2/61137

[51] Int. Cl.$^4$ ............ C10B 47/00; C10B 51/00; C10B 53/00
[52] U.S. Cl. ............................ 201/6; 201/19; 201/25; 435/173; 585/240
[58] Field of Search ................. 201/2.5, 6, 19, 25; 585/240-242; 435/173; 210/769, 770; 48/209

[56] References Cited

U.S. PATENT DOCUMENTS

| | | | |
|---|---|---|---|
| 2,196,361 | 4/1940 | Liebesny et al. | 435/173 |
| 3,843,457 | 10/1974 | Grannen et al. | 201/19 |
| 4,118,282 | 10/1978 | Wallace | 201/25 |
| 4,282,066 | 8/1981 | Wagener et al. | 201/6 |
| 4,420,320 | 12/1983 | Hartmann et al. | 201/25 |

FOREIGN PATENT DOCUMENTS

25369 3/1981 European Pat. Off. ............ 435/173

Primary Examiner—Joye Woodard
Attorney, Agent, or Firm—Stevens, Davis, Miller & Mosher

[57] ABSTRACT

Organic material is compacted to a density greater than 280 kg/m$_3$ in a press, is preheated to a temperature of 44°–46° C., is then subjected in an irradiation device to 1–20 electromagnetic wave pulses having a duration of almost 5 s and a frequency between 800 and 2000 MHz and is subsequently subjected to a fermentation causing its heating, until its temperature has risen to 85°–90° C., and is subjected to pyrolysis in a pyrolysis oven. During irradiation, fermentation and pyrolysis no air is supplied to the material.

5 Claims, 1 Drawing Sheet

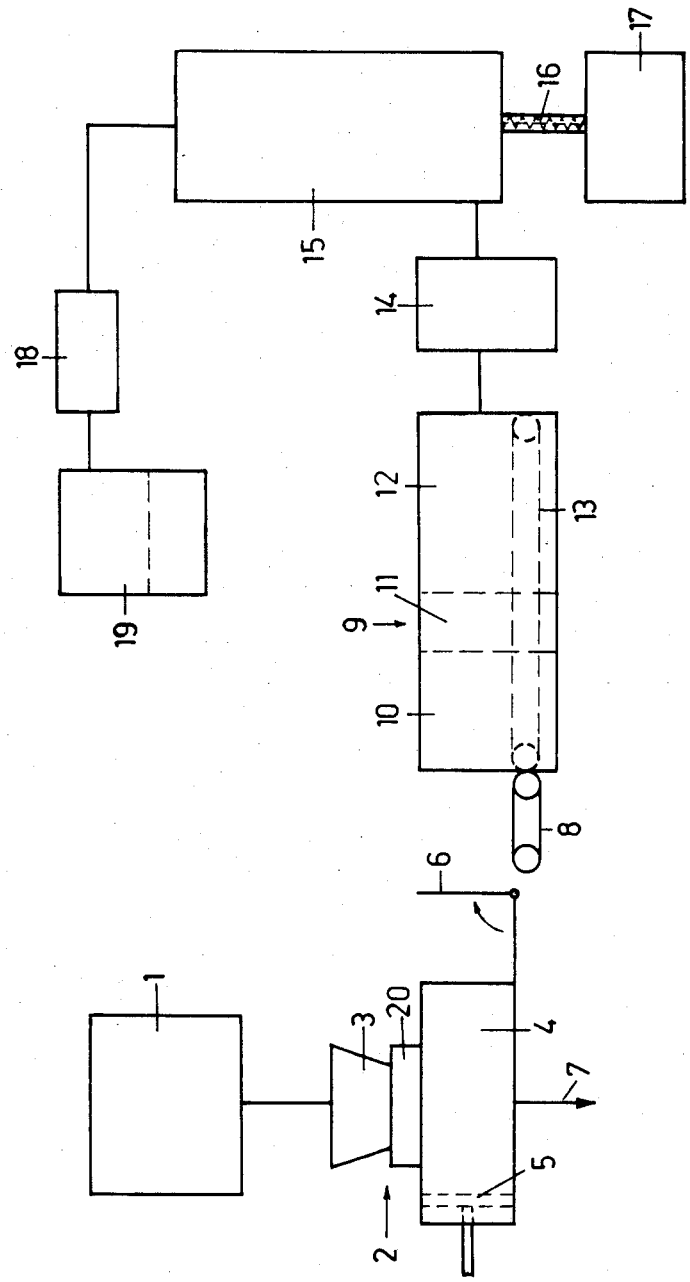

METHOD FOR PROCESSING SUBSTANTIALLY SOLID ORGANIC MATERIAL

BACKGROUND OF THE INVENTION

1. Field of the Invention

This invention relates to a method of processing substantially organic material in solid form, in which the organic material is compacted in a first phase.

Organic material is meant here in a wide sense, so that it includes not only matter of vegetable origin, such as peat, seaweed and waste wood, but also solid carbon compounds, such as rubber or synthetic material, but especially also animal fertilizers.

The material to be processed may also partially comprise inorganic material, such as metal and ceramic materials.

The method is very suitable for utilizing domestic or animal refuse.

As far as the method is applied to refuse, this refuse is not only utilized, but the problem of how to destroy this refuse is of course solved too.

A condition of such a method is that it is inexpensive and efficient.

2. Description of the Prior Art

A method of utilizing domestic refuse is known from Dutch patent application No. 6802199.

According to this prior method the domestic refuse is hydraulically compacted to briquettes, after which the briquettes formed are coated with a layer of airtight and moisture-proof material.

During compaction, part of the moisture contained in the refuse is pressed out, and the remaining solid material is deformed and homogenized. The moisture left in the material is uniformly distributed over the compacted mass.

The briquettes obtained are used as building bricks. In this method domestic refuse is utilized only to a limited extent.

THE INVENTION

The object of the invention is to provide a method of processing organic material admitting of a better utilization than is obtained by conventional compaction.

To this end, the material compacted in a first phase is irradiated in a second phase with at least one electromagnetic wave pulse having a frequency between 300 MHz and 300 GHz, after which, in a third phase, the compacted and irradiated material is subjected to a pyrolysis with avoidance of any air supply between the second and the third phase.

In a special embodiment of the invention the compacted material is irradiated in the second phase with a number of pulses having a duration of almost 5 sec ranging between 1 and 20.

In a remarkable embodiment of the invention the material is compacted in a first phase at a pressure of at least 15 MPa.

In a preferably used embodiment of the invention the material is compacted in the first phase to a density of at least 280 kg/m$^3$.

In an effective embodiment of the invention the temperature of the material irradiated in the second phase is allowed to rise to 85°–90° C. prior to pyrolysis.

The invention also relates to an apparatus which is very suitable for carrying out the method according to one of the previous embodiments.

The invention therefore relates to an apparatus for processing substantially organic material, comprising a press, and the characteristic feature of which consists in that it additionally comprises an electromagnetic irradiation device capable of transmitting electromagnetic pulses having a frequency between 300 MHz and 300 GHz, means for carrying the material compacted in the press from this press to the irradiation device, a pyrolytic oven, and means for carrying the material irradiated in the irradiation device from this irradiation device to the pyrolytic oven without addition of outside air.

Preferably, the irradiation device comprises a prepatory part, an irradiation part connected thereto and a fermentation part connected to the irradiation part.

Other details and advantages of the invention will appear from the following description of a method of processing substantially organic material and of an apparatus used therefor, according to the invention; this description is only given by way of example and does not limit the invention; the reference numerals relate to the attached drawing.

BRIEF DESCRIPTION OF THE DRAWING

The FIGURE is a block scheme of an apparatus for processing substantially organic material, according to the invention.

DESCRIPTION OF A PREFERRED EMBODIMENT

The apparatus according to the FIGURE comprises a reservoir 1 for storing the material to be processed.

This material is substantially organic but may contain up to 20 wt. % inorganic material, such as metal, glass or ceramic material.

As organic material the material to be processed may contain waste paper, textile or wood, vegetable refuse, etc.

The material to be processed is heterogeneous not only in regard to the composition but also in respect of the moisture content. Parts of vegetable origin present in the material may contain up to 95 wt. % moisture, while other parts, such as paper, contain practically no moisture.

The average degree of moisture in the material to be processed is mostly about 30 wt. %.

By means of a valve, material is passed from the reservoir 1 to a press 2.

This press 2 comprises a feeding hopper 3 opening into a push-in press 20, a main pressure chamber 4, into which the push-in press 20 opens, and in which a reciprocating piston 5 is arranged, and a rotatable discharge mechanism 6 disposed opposite the end of the pressure chamber 4.

During a stroke of piston 5 the material to be processed is compacted in the closed pressure chamber 4 at a pressure of at least 15 MPa to a density of at least 280 kg/m$^3$. The material is then homogenized, and moisture is partially pressed out. The pressed-out moisture is collected and passed via a drain 7 to a waste water treating plant.

Under the above-mentioned conditions a homogeneous briquette is formed in the pressure chamber 4, in which briquette the moisture content has fallen to 9 wt. % and the temperature has risen to 30°–35° C. The moisture content of the briquette may range from 7–10 wt. %.

At the end of the stroke of piston 5, the briquette formed is pushed by said piston out of pressure chamber 4, after the end of this chamber has been opened.

This briquette is received on the discharge mechanism 6 which, after rotation, delivers the briquette to a conveyor 8.

Both the conveyor 8 and the press 2 have a known per se structure and are commercially available. These parts will therefore not be described here in detail.

A press which is very suitable for use in the method is commercially sold under the name of "Tezuka".

A suitable conveyor 8 is, e.g., an endless steel belt. The conveyor 8 carries the briquettes successively formed in the press 2 to an irradiation device 9.

As a result of the compaction in the press 2 the oxygen contents in the briquettes formed have become rather low, while the temperature thereof has risen to 30°-35° C.

The irradiation device 9 is in the form of a tunnel which may be divided into three parts, namely a preparatory part 10, an irradiation part 11 and a fermentation part 12.

The briquettes of compacted material are carried through these parts by means of an endless steel conveyor belt 13.

In the preparatory part to the briquettes of compacted material are brought to the desired degree of moisture and further heated by hot gases flowing from the parts 11 and 12 of the irradiation device 9 in countercurrent with the briquettes and leaving the tunnel via the front end where they are collected and discharged.

Care is taken that the temperature of the briquettes of compacted material when entering the irradiation part 11 ranges between 44° and 46° C.

In the irradiation part the compacted material is irradiated with 1-20 electromagnetic wave pulses having a duration of 5 s and a frequency between 300 MHz and 300 GHz, especially between 800 and 2000 MHz.

To this end, use is made of one or more so-called magnetron and/or ionotron ovens. Such ovens are known as such and are used among other things, for defrosting deep-frozen meat.

The electromagnetic wave pulses vibrate the molecules of the compacted material. At the resulting density of the material and the selected wavelength of the electromagnetic wave pulses a vibration of the molecules is obtained in the order of 35000 vibrations to the second.

These pulses activate the bacterial effect in the compacted material and start a biological fermentation process Especially the Stearo Thermophyllis bacteria and other bacteria causing in nature the fermentation and putrefaction are activated.

Although these bacteria multiply rather rapidly, they would not decompose the organic material rapidly enough to provide a useful industrial method of economically and efficiently processing organic refuse without the electromagnetic pulses.

With the electromagnetic pulses the decomposition of the organic material takes only about twenty minutes.

This decomposition starting in the irradiation part 11 is continued in the fermentation part 12.

This biological decomposition causes the temperature in the fermentation part 12 to rise to 85°-90° C.

The above-mentioned biological decomposition in the fermentation part 12 is an almost completely anaerobic process. The supply of outside air to this part 12 is avoided by a discharge lock 14 connecting to the back end of the tunnel of the irradiation device 9.

The lock 14 is mounted between the irradiation device 9 and the pyrolytic oven 15, in which the fermented briquettes are subjected to a pyrolysis at 240°-600° C.

The pyrolysis takes place in the absence of air, and the above-mentioned lock 14 provides that when the material is introduced into the pyrolytic oven 15, no oxygen can penetrate into the oven 15 and no oxygen is present in the material itself either.

This lock 14 comprises a chamber provided at both ends with a lock door. After the material has been carried into the chamber through one lock gate and this gate has been closed, the chamber is filled with nitrogen. Subsequently, the material can leave the chamber via the other lock gate.

The transport through the lock 14 and therefore the feed of the pyrolytic oven 15 is effected by means of a conveyor belt mounted within the lock 14.

The pyrolytic oven has a conventional structure, in which the material is carried through a plurality of tubes which are heated from the outside by hot gases or irradiation heat. The structure of this pyrolytic oven is therefore not described here in detail.

The pyrolysis is carried out under atmospheric pressure and at a temperature which is of course above the flash point of the material.

In the pyrolytic oven the organic material is converted into gases by means of a kind of dry distillation.

Inorganic substances or other solid or liquid residues of the material introduced into the oven 15 are discharged from the pyrolytic oven 15 by means of a worm 16 and carried to a closed container 17.

The gases are condensed in a condenser 18 so as to obtain an oily phase in which heavier carbon components are dispersed.

Decantation for at least 12 hours and further cooling to room temperature in a decanter 19 cause this dispersion to separate into a liquid and a solid phase.

A part of the separated liquid can be used as a fuel for heating the pyrolytic oven 15.

As stated before, the organic material may contain inorganic substances, such as metal or glass.

It may be advantageous not to remove these materials from the organic material before the method is applied. In the pyrolytic oven these inorganic substances, and especially the metals, form heat conductors which ensure a uniform distribution of the heat throughout the material in the pyrolytic oven.

The glass contained in the material melts in the pyrolytic oven and disintegrates into a grainy mass when the solid residue is cooled. The metals and the grains of glass can be removed more easily from this cooled residue than from the original organic material.

The above-described apparatus is rather simple. The method is relatively inexpensive and very efficient. Organic waste materials are converted continuously into valuable final products, namely gases and a liquid capable of being used as a fuel. The resulting fuel is more than efficient to heat the pyrolytic oven so that not only are the waste products destroyed, but even excess fuel is obtained.

The invention is by no means restricted to the above-described embodiment, and within the framework of the patent application the embodiment described admits of many modifications, inter alia as regards the form, composition, arrangement and number of the parts used for realizing the invention.

In particular, the press need not necessarily consist of a feed hopper, a push-in press and a main pressure chamber with a reciprocating piston. The main pressure chamber may comprise several pistons displaceable in different directions, and the press may have several main pressure chambers with one or more pistons.

The compaction to the desired density may therefore be effected in different steps in the same chamber or in several chambers. It is only important that the material to be processed should be compacted to the desired density and that part of the moisture should be removed from this material.

The different conveyors need not necessarily have the above-described structure.

Between the press and the irradiation device the briquettes may be cut if, e.g., the dimensions do not correspond to the dimensions of the tunnel of the irradiation device.

I claim:

1. A method for processing substantially solid organic material containing fermentation and putrefaction bacteria comprising compacting the organic material at a pressure of at least 15 MPa to a density of at least 280 kg/m$^3$; heating the compacted material to a temperature of 44°–46° C.; irraditing the heated compacted material under an aerobic condition with electromagnetic wave pulses with a frequency between 800 and 2000 MHz to activate rapidly the bacteria to a fermentation condition; subjecting the irradiated material to fermentation to biologically decompose said compacted organic material to produce fermentation gases and to raise the temperature of said compacted material to 85°–90° C.; utilizing said fermentation gases for heating said compacted material to said temperature of 44°–46° C. before irradiation; and pyrolyzing said compacted, irradiated and biologically decomposed material in the absence of air to produce pyrolysis gases.

2. The method of claim 1, in which said pyrolyzing is carried out at a temperature which ranges between 240° C. and 600° C.

3. The method of claim 1, further comprising condensing the gases obtained by said pyrolyzing to form a condensate and separating said condensate into a solid phase and a liquid phase.

4. The method of claim 1, in which irradiation is performed with a number of pulses ranging between 1 and 20, each of said pulses having a duration of almost 5 s.

5. The method of claim 1, wherein the organic material has a moisture content of about 30 wt. % prior to compaction which is reduced to from 7–10 wt. % after compaction.

* * * * *